United States Patent
Gandhi

(10) Patent No.: US 10,685,393 B2
(45) Date of Patent: *Jun. 16, 2020

(54) DEVICE, METHOD, AND MEDIUM FOR FACILITATING PURCHASES USING PERIPHERAL DEVICES

(71) Applicant: PAYPAL, INC., San Jose, CA (US)

(72) Inventor: Saumil Ashvin Gandhi, Sunnyvale, CA (US)

(73) Assignee: PayPal, Inc., San Jose, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 15/854,546

(22) Filed: Dec. 26, 2017

(65) Prior Publication Data

US 2018/0121996 A1 May 3, 2018

Related U.S. Application Data

(63) Continuation of application No. 14/141,305, filed on Dec. 26, 2013, now Pat. No. 9,852,467.

(51) Int. Cl.
*G06Q 30/00* (2012.01)
*G06Q 30/06* (2012.01)
*H04R 1/10* (2006.01)
*G06F 3/16* (2006.01)

(52) U.S. Cl.
CPC ......... *G06Q 30/0641* (2013.01); *G06F 3/165* (2013.01); *H04R 1/1041* (2013.01); *H04R 2430/01* (2013.01)

(58) Field of Classification Search
CPC ................. G06Q 30/0601; G06Q 30/0641
USPC .............................................. 705/26.1, 27.1
See application file for complete search history.

(56) References Cited

U.S. PATENT DOCUMENTS

2002/0002039 A1* 1/2002 Qureshey ........... G06Q 30/0641
455/344

OTHER PUBLICATIONS

Vega, Tanzina, Impulse Buying on TV Enters an Even Faster Phase, Jun. 30, 2011, New York Times Company discloses allowing viewers to use their remote control to purchase items. (Year: 2011).*

* cited by examiner

*Primary Examiner* — Brittney N Miller
(74) *Attorney, Agent, or Firm* — Haynes and Boone, LLP

(57) ABSTRACT

A peripheral device, e.g., a headphone, connected to a communication device may have controls that are configured to switch between a regular mode and a purchase mode. When in the purchase mode, the controls of the peripheral device may be configured to facilitate purchase by receiving user input related to making a purchase. The peripheral or the communication device may be configured to receive user instructions, such as a voice command, to switch between the regular mode and the purchase mode. In particular, the controls may include volume buttons configured to adjust volume in the regular mode and configured to adjust purchase price in purchase mode. The controls also may include a start/end button configured to selectively activate or end an application in the regular mode and configured to confirm or select a purchase in the purchase mode.

20 Claims, 5 Drawing Sheets

DEVICE, METHOD, AND MEDIUM FOR FACILITATING PURCHASES USING PERIPHERAL DEVICES

CROSS REFERENCED TO RELATED APPLICATIONS

This continuation patent application claims priority to and the benefit of U.S. patent application Ser. No. 14/141,305, filed Dec. 26, 2013, and issued on Dec. 26, 2017 as U.S. Pat. No. 9,852,467, the contents of which are incorporated by reference in its entirety.

BACKGROUND

Field of the Invention

The present invention generally relates to systems and methods for facilitating purchases using peripheral devices.

Related Art

In today's internet commerce, many purchases are made online via the internet. For example, a user may use a mobile device to make purchases and facilitate payments. Many mobile devices are configured to be connected to peripheral devices, such as an audio headphone. When the mobile device is connected to the peripheral device, the user may have access to the peripheral device but not the mobile device itself. When the user wishes to make an online purchase using the mobile device, the user has to find and bring out the mobile device, which is inconvenient to the user. Therefore, there is a need for a system or method that allows the user to facilitate online purchase using the peripheral device, which is connected to the mobile device and is sometimes more accessible to the user than the mobile device.

Figure 1:
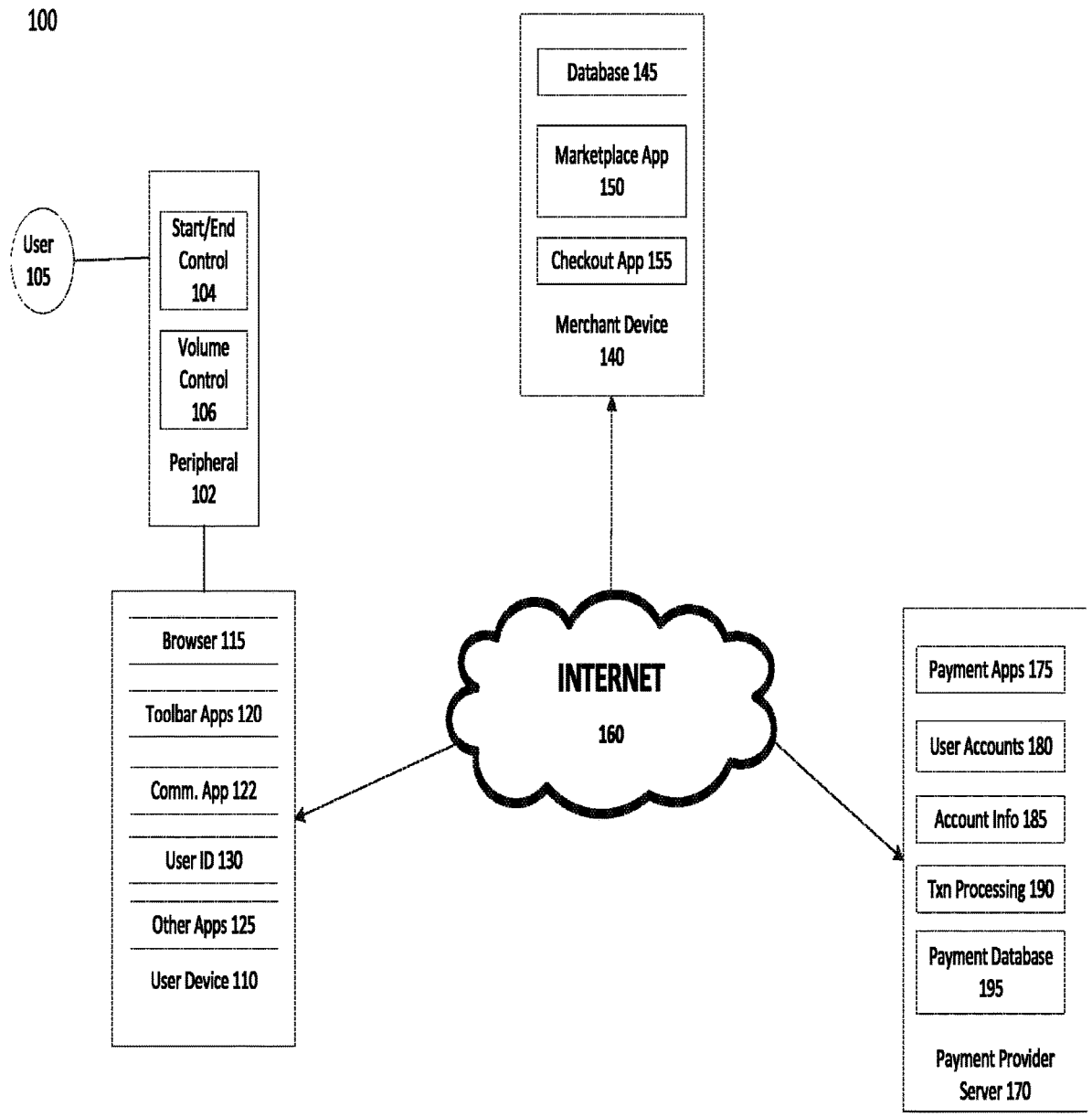
FIG. 1 is a block diagram of a networked system suitable for facilitating purchases using peripheral devices according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a peripheral device, e.g., a head phone, connected to a communication device may have controls that are configured to switch between a regular mode and a purchase mode. When in the purchase mode, the controls of the peripheral device may be configured to facilitate purchase by receiving user input related to making a purchase. The peripheral or the communication device may be configured to receive user instructions, such as a voice command, to switch between the regular mode and the purchase mode. In particular, the controls may include volume buttons configured to adjust the volume in the regular mode and configured to adjust the purchase price in purchase mode. The controls also may include a start/end button configured to selectively activate or end an application in the regular mode and configured to confirm or select a purchase in the purchase mode.

In an embodiment, an inline connector device may be provided between the peripheral device and the communication device to provide controls for facilitating purchases. The inline connector device may have controls for price adjustment and a display configured to display a price. The inline connector also may have a confirmation button for confirming or selecting purchases. A microphone may be provided on the inline connector device to receive a user's voice command.

FIG. 1 is a block diagram of a networked system 100 suitable for implementing a process for facilitating purchases using peripheral devices according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a peripheral device 102, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. User 105 may input instructions for making a purchase to user device 110 via peripheral device 102. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

User device 110, peripheral device 102, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

Peripheral device 102 may be connected to user device 110. Peripheral device 102 may be an audio output device, such as a headphone or an earpiece. Peripheral device 102 may include one or more speakers configured to output audio sound to user 105. Peripheral device 102 may be connected to user device 110 by wire or wirelessly. For example, peripheral device 102 may be connected to user device 110 via a phone connector. The phone connector may be inserted into a phone jack, e.g., a 2.5 mm or a 3.5 mm jack, of user device 110. Audio signals may be output from user device 110 to peripheral device 102 via the phone connector. Control signals may be communicated between the peripheral device 102 and user device 110 via the phone connector as well.

In an embodiment, peripheral device 102 may be connected to user device 110 wirelessly via Bluetooth or Near Field Communication (NFC). For example, peripheral device 102 may be paired wirelessly with user device 110 to establish wireless communication. Audio signals and/or control signals may be communicated wirelessly between peripheral device 102 and user device 110.

Peripheral device 102 may include a start/end control button 104. The start/end control button 104 may be configured to receive user instructions for starting or ending an audio recording or a program/application. For example, user 105 may press start/end control button 104 to start a voice command application at user device 110. User 104 also may press start/end control button 104 to start playing an audio recording at user device 110 and may press start/end control button 104 again to stop or pause playing of the audio recording.

Peripheral device 102 may include a volume control 106. Volume control 106 may include buttons configured to adjust a volume level output at peripheral device 102. Volume control 106 may include a plus button for increasing the volume level and a minus button for decreasing the volume level. Volume control 106 may adjust a volume of audio output at user device 110. In an embodiment, volume control 106 may adjust volume of audio output generated at peripheral device 102. For example, user device 110 may send a general digital audio signal to peripheral device 102 wirelessly. Peripheral device 102 may receive and process the digital audio signal and adjust volume accordingly. The controls may include physical button keys that may be pressed by user 105. In one embodiment, the controls may include touch sensitive surfaces configured to sense a touch or swipe of user 105's fingers to receive user commands.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a saving account. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

Figure 2:
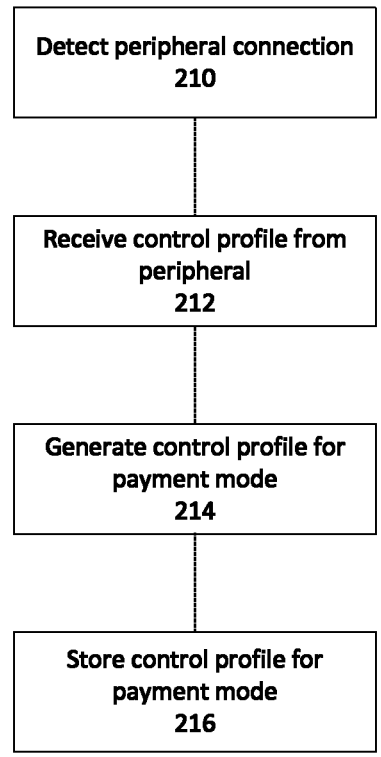
FIG. 2 is a flowchart showing a process for setting up a peripheral device for facilitating purchase according to one embodiment.

FIG. 2 is a flowchart showing a process 200 for setting up a peripheral device for facilitating purchase according to one embodiment. At step 202, user device 110 may detect a connection of peripheral device 102. For example, user device 110 may include a phone jack sensor configured to detect a phone connector, e.g., a 3.5 mm or 2.5 mm plug, when the phone connector is inserted into a phone jack of user device 110.

In one embodiment, user device 110 may connect wirelessly to peripheral device 102 via Bluetooth or NFC. For example, user device 110 may detect a wireless request from peripheral device 102 to register or setup a wireless connection with peripheral device 102. For Bluetooth peripheral devices, user device 110 may perform a wireless pairing process with the Bluetooth peripheral devices to establish wireless Bluetooth connections. In one embodiment, user device 110 may connect to multiple wireless peripheral devices simultaneously. For example, user device 110 may connect to a Bluetooth earpiece and a stereo system of a car simultaneously.

At step 212, user device 110 may receive a control profile from the connected peripheral device 102. The control profile may include control specification, such as start/end control 104 or volume control 106, provided at peripheral device 102. The control profile may include information such as the name or identification or peripheral device 102, wireless frequency, signal patterns designated for various controls, and the like. Thus, the control profile may provide instructions on how the controls provided at peripheral device 102 may be used to control different setting or features at user device 102. For example, peripheral device 110 may have start/end control 104 and volume control 106. The control profile may indicate the kind of signal patterns that are output from peripheral device 110 to user device 102 when user 105 presses the respective control buttons. Thus, user 105 may operate the controls provided at peripheral device 102 to adjust various settings or control operations at user device 110.

In one embodiment, a predetermined control profile for peripheral device 102 may be preset at user device 110. For example, a headphone, e.g., iPhone ear pieces, may include controls designed to be used by a predetermined control profile of user device 110, e.g., iPhone. Thus, a predetermined control profile may be included in an Operating System (OS) of user device 110 to receive control signals from a peripheral device 102. The controls provided at peripheral device 102 may allow user 105 to control various settings or operations at user device 110. For example, user 105 may use volume control 106 provided at peripheral device 102 to adjust volume of audio recording output from user device 110 to peripheral device 102. User 105 may use start/end control 104 to selectively play and pause a music player at user device 110 or answer phone calls received at user device 110. Various patterns of button pressing or holding may be used to command different functions. For example, two consecutive presses on start/end control 104 may indicate next page/song and three consecutive presses on start/end control 104 may indicate previous page/song. Accordingly, user device 110 may execute various commands based on the various control signals received from peripheral device 102 and the control profile.

At step 214, user device 110 may generate a control profile for payment mode. In particular, based on the control profile of peripheral device 102, user device 110 may generate an alternate control profile that may be used by user 105 to facilitate a purchase. User device 110 may analyze the available controls provided at peripheral device 102 and may assign the available controls to functions for making purchase. For example, user device 1110 may assign start/end control 104 to have functions of confirming purchases. Further, volume control 106 may be assigned to have function of adjusting price of purchase or quantity of purchase. Accordingly, a control profile may be set up for facilitating purchases at peripheral device 102. In some embodiments, a control profile for a browsing mode may be set up for browsing contents of application or web pages. For example, volume control 106 may be assigned to have functions of navigating forward or backward among contents or web pages.

At step 216, user device 110 may store the control profile for the purchase mode. Thus, the controls at peripheral device 102 may operate in multiple modes, e.g., multifunctions. Further, user device 110 may store control profiles for other peripheral devices. Thus, user device 110 may organize the control profiles by peripheral devices. For example, each peripheral device may have multiple control profiles.

By using the above process 200, multiple control profiles may be established for peripheral device 102. The control profiles may include a regular mode control profile for controlling regular functions, such as audio setting, stop/play command, volume setting, and the like, and a payment mode control profile for facilitating purchases, such as functions for confirming purchase, price/quantity adjustment, and the like.

Figure 3:
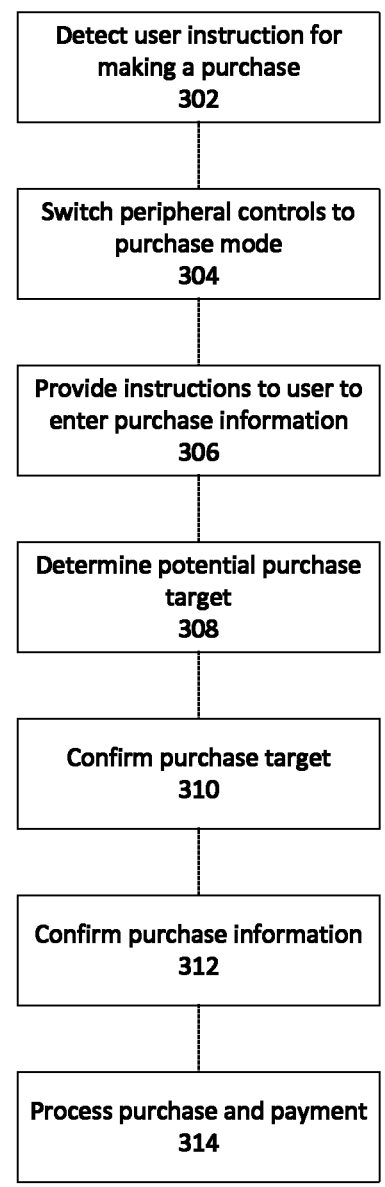
FIG. 3 is a flowchart showing a process for facilitating purchase using a peripheral device according to one embodiment.

FIG. 3 is a flowchart showing a process for facilitating purchase using a peripheral device according to one embodiment. At step 302, user device 110 may detect a user instruction to make a purchase. A voice command from user 105 may be received via a microphone provided at peripheral device 102 to instruct user device 110 to begin a purchase process. For example, user 105 may say "Buy gadget!" to the microphone of peripheral device 102 to instruct user device 110 to begin a purchase process. In some embodiments, a predetermined control provided at peripheral device 102 may be pressed by user 105 to begin a purchase process. For example, user 105 may press a button of start/end control 104 three consecutive times to begin a purchase process.

At step 304, user device 110 may switch the control profile of peripheral device 102 to the purchase mode. As noted above in step 214, a control profile for purchase mode may be generated based on the controls available at peripheral device 102. Although the control signals generated by the controls at peripheral device 102 may remain the same, user device 110 may interpret these control signals for commanding different functions related to making a purchase. For example, control signals for adjusting volume setting in the normal mode may now be used in the purchase mode for adjusting prices or quantities of purchase.

In some embodiments, peripheral device 102 may include various light devices, such as LED lights with different colors, configured to display different types or patterns of light to indicate different modes of peripheral device 102. For example, a blue LED light of peripheral device 102 may blink when peripheral device 102 is in the regular mode and a red LED light of peripheral device 102 may blink when peripheral device 102 is in the purchase mode. In another embodiment, different patterns of blinking may be used to indicate different modes.

At step 306, user device 110 may provide instructions to user to enter purchase information. In particular, user device 110 may output audio instruction to user 105 via peripheral device 102 to direct user 105 on how to enter information to facilitate a purchase. For example, when user 105 gives instructions to make a purchase, user device 110 may provide an audio response: "Would you like to make a purchase? Press start/end button twice to confirm."

After user 105 confirms to begin a purchase process, user device 110 may determine a potential purchase target at step 308. User device 110 may analyze an application currently being executed or an advertisement currently being presented to user 105 to find a potential purchase target. For example, if user 105 is currently listening to a song using an online radio application on user device 110, the potential purchase target may be the song currently being played to user 105. In another example, if an advertisement for a gadget is currently being presented to user 105, the purchase target may be the gadget being advertised.

At step 310, user device 110 may confirm the purchase target with user 105. In particular, user device 110 may output audio inquiries to the user to confirm the purchase target. For example, user device 110 may output the inquiry: "Would you like to purchase the song currently being played? Press start/end button twice to confirm or press once to decline."

At step 312, user device 110 may inquire and confirm the price and/or quantity of purchase from user 105 via controls at peripheral device 102. For example, user device 110 may output an audio inquiry: "Please enter purchase price using the + and − volume buttons. Press start/end button twice to confirm price." User device 110 also may output an audio inquiry: "Please enter the number of items to purchase using the + and − volume buttons. Press start/end button twice to confirm number of items to purchase." When user 105 presses the volume buttons, user device 110 may simultaneously output an audio of the current price or number of items. For example, if the number of items is eight and user 105 presses the + button, user device 110 may output an audio of "nine." Thus, user 105 may be informed of the current value of price or number of items being adjusted by listening at peripheral device 102. User device 110 also may allow user 105 to select and confirm a method of payment using controls at peripheral device 102.

After the price and number of items are confirmed, user device 110 may begin the purchase and payment process at step 314. For example, user device 110 may send the purchase order to merchant device 140 or payment provider server 170 to be processed. Based on the purchase order, merchant device 140 may send the merchandize to user 105 and payment provider server 170 may process payment between user 105 and merchant device 140.

In some embodiments, a browsing mode may be activated similarly by a user voice command. The controls at peripheral device 102 may be operated in the browsing mode to navigate electronic contents, such as web pages or application contents. For example, the plus and minus buttons may be used for moving forward/backward or up/down among web pages or contents. The start/end button may be used for the "enter" function to activate links or contents.

Other pressing patterns, such as pressing start/end button twice or three times, also may be used to perform other navigation functions. For example, the plus and minus buttons may be used to move up and down among different items of a menu or page. Three consecutive presses on the start/end button may indicate an instruction to go to the next page and two consecutive presses on the start/end button may indicate an instruction to return to the previous page.

User device 110 may output audio instructions to guide user 105 on how to browse or navigate using the controls of peripheral device 102. For example, user device 110 may output: "Use the plus and minus button to move up and down within a page." User device 110 also may output content currently being browsed by audio. For example, user device 110 may read the items of a menu or page currently being browsed or navigated audibly to user 105, such that user 105 may be notified of the current browsing location.

By using the above processes 200 and 300, user 105 may use the controls provided on peripheral device 102 to facilitate purchase. In particular, the controls of peripheral device 102 may switch between a regular mode for controlling volume settings or application settings to a purchase mode for facilitating a purchase. Thus, user 105 may operate user device 110 using the controls at peripheral device 102 even when user 105 has no direct access to user device 110. Therefore, when user device 110 is stowed away, user 105 may still operate peripheral device 102 to make a purchase without taking user device 110 out.

Figure 5:
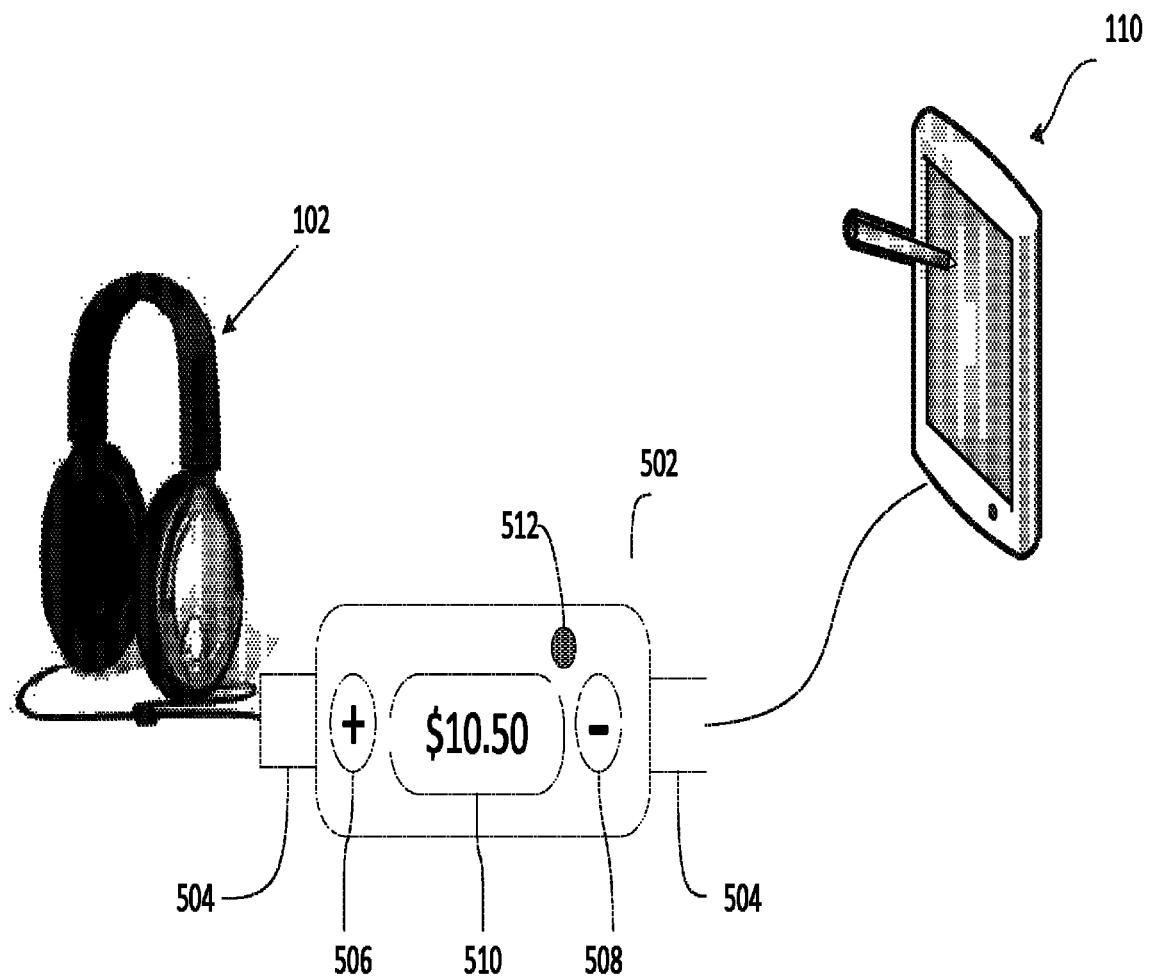
FIG. 5 is a block diagram illustrating a system for facilitating purchases using an inline connector device according to one embodiment.

FIG. 5 illustrates a system for facilitating purchases using an inline connector device according to one embodiment. When peripheral device 102 has no controls and is connected to user device 110, an inline connector device 502 may be used to facilitate purchase. Inline connector device 502 may be connected between peripheral device 102 and user device 110. Inline connector device 502 may include phone connecting jacks 504 at both ends thereof to connect to peripheral device 102 at one end and user device 110 at the other end.

Inline connector device 502 may be registered at payment provider server 170 and may be associated with a payment account of user 105. Inline connector device 502 may be set up to coordinate with a payment application at user device 110. Inline connector device 502 may include a microphone 512 configured to receive voice commands from user 105. Inline connector device also may include a display 510 configured to display purchase information, such as purchase price or purchase quantity. Plus and minus buttons 506 and 508 also may be provided for price or quantity adjustments. Thus, user 105 may use inline connector device 502 to facilitate making a purchase. For example, user 105 may use voice command to begin a purchase process by speaking into microphone 512.

A purchase application may be activated at user device 110 to find a purchase target. User 105 may use voice command via microphone 512 or buttons 506 and 508 to facilitate making a purchase. The purchase application at use device 110 also may provide audio instructions to user 105 to guide user 105 through the purchase process. For example, audio instructions may state: "Use plus and minus buttons to adjust price and press plus and minus buttons simultaneously to confirm price." Display 510 may display information to user 105 regarding the purchase, such as a status of purchase, purchase price, purchase quantity, payment information, and other purchase information.

In some embodiments, the control buttons 506 and 508 and display 510 of inline connector device 502 may have multiple functions. In particular, the control buttons 506 and 508 may switch between different control modes. For example, in a purchase mode, control buttons 506 and 508 may be used for adjusting purchase price or quantity of items. In a music mode, control buttons 506 and 508 may be used for adjusting volume or for navigating between different music recordings. In the purchase mode, display 510 may display a name of purchase item or a price of item. In the music mode, display 510 may display information related to the music, e.g., song name, artist name, and the like. In some embodiments, the control buttons 506 and 508 and display 510 of inline connector device 502 may be used in a browsing mode to navigate among web pages or web contents. For example, control buttons 506 and 508 may be used to move forward or backward among web pages or contents.

In some embodiments, because inline connector device 502 is already registered at payment provider server 170 and is associated with user 105's payment account, the payment authentication process may be simplified. For example, payment service provider 170 may recognize a unique ID of inline connector device 502 and may authorize payment without user login or password. Thus, inline connector device 502 may allow rapid and convenient purchase to be made by user 105. Further, inline connector device 502 may provide user 105 with the means to facilitate a purchase even when peripheral device 102 does not provide controls that may be used for making purchase.

The following are exemplary scenarios in which the above processes 200 and 300 may be implemented.

Example 1

The user is listening to music using a smart phone and a headphone connected to the smart phone by a phone connector. The headphone has a microphone, a start/end button and volume control buttons. The smartphone is stowed away in the user's backpack and the user is wearing the headphone. The user is using an online radio application to listen to popular songs. The radio application presents an audio advertisement to the user in between songs. The user wishes to purchase a widget promoted by an audio advertisement. The user speaks a voice command: "Buy widget."

The smart phone listens passively for user command and detects the user's command for making a purchase. The smart phone activates a purchase application and searches for possible purchase targets. The smart phone determines that the widget promoted by the audio advertisement is a possible purchase target. The smartphone also switches the controls on the headphone from the regular mode to the purchase mode. The smart phone then inquires the user: "Would you like to purchase the widget? Press start/end button to confirm." In response, the user presses the start/end button at the headphone to confirm.

The smart phone then inquires the user of the quantity of widget to purchase by outputting an audio inquiry: "Use the plus and minus buttons to adjust the number of widgets to buy. Press start/end button to confirm the number of widgets." The user wishes to purchase three widgets. The user presses the plus button and the smart phone outputs: "one" by audio. The user presses the plus button again and the smart phone outputs: "two" by audio. The user presses the plus button the third time and the smart phone outputs: "three" by audio. The user then presses the star/end button to confirm the number of widgets to buy.

The smart phone outputs: "You have entered three widgets to be purchased. Please select method of payment by using the plus minus buttons and press start/end button to select the method of payment." The user presses the plus button and the smart phone outputs: "pay by credit card" by audio. The user presses the plus button again and the smart phone outputs: "pay by PayPal" by audio. The user wishes to pay by PayPal and presses the start/end button to confirm the method of payment by PayPal. The smartphone then outputs: "Processing payment via PayPal."

The smartphone then may forward the purchase order to the merchant and/or to PayPal. PayPal may process the payment by debiting from the user's payment account and crediting the merchant. The merchant then may be notified of the purchase and payment. The merchant may begin to prepare and ship the widgets to the user. A confirmation may be forwarded to the user to confirm purchase. For example, the smartphone may output: "Purchase and payment are processed" by audio. Thus, the user may facilitate a purchase using the controls on the headphone without having to take out the smartphone from the backpack.

Example 2

The user is driving in a car. The user's mobile device is connected to the car's stereo system via Bluetooth communication. As such, the audio output from the mobile device is directed to the stereo speakers of the car and the user may control the mobile device using buttons on the car's steering wheel. The steering wheel has up and down buttons for volume control, forward and backward buttons for navigating music tracks, and start/end button for starting and stopping music. The car also has a microphone configured to receive voice commands.

The user is listening to music on the car's stereo system using an internet radio application on the mobile device. The user may adjust volume of the music by using the volume buttons on the steering wheel and may navigate among different radio stations using the forward and backward buttons. The user hears a song on the radio that the user wishes to purchase. The user gives a voice command: "Buy song!" to the microphone in the car. The mobile device detects the voice command to make a purchase and begins the purchase process. Further, the mobile device switches the control profile of the car to the purchase mode.

The mobile device determines that the potential purchase target is the song currently being played by the mobile device. The mobile device outputs: "Would you like to purchase this song? Press start/end button on the steering wheel to confirm." The user presses the start/end button to confirm the song purchase. The mobile device then begins the purchase and payment process for purchasing the song. The mobile device finds the merchant and the price for the song. The mobile device outputs: "The price of the song is $1.99. Press start/end button to accept price" by audio. The user presses the start/end button on the steering wheel to agree to purchase the song for $1.99. In response, the mobile device begins the payment process. The purchase order is forwarded to the payment provider and the payment provider may debit $1.99 from the user's payment account and credit the same to the merchant. The merchant then authorizes the mobile device to begin downloading the song to the mobile device. The mobile device outputs: "Song has been purchased and downloaded to the mobile device." Accordingly, the user may make a purchase while driving in the car by using control buttons on the steering wheel without looking at or operating the mobile device. Thus, the above features may provide convenience and safety to the user.

Figure 4:
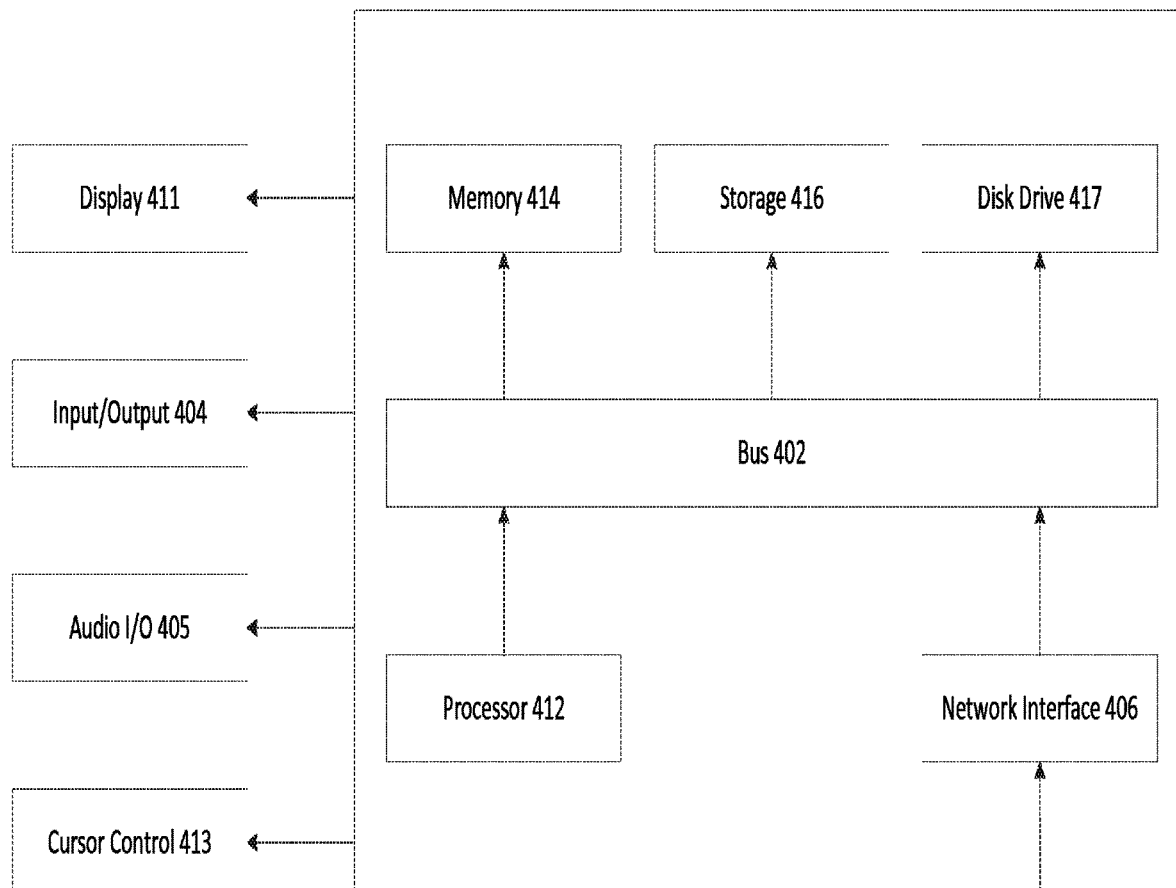
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A communication device comprising:
a non-transitory memory; and
one or more hardware processors coupled to the non-transitory memory and configured to read instructions from the non-transitory memory to cause the communication device to perform operations comprising:
receiving, via an inline connector device connected to the communication device, a request to switch functions of the inline connector device via control buttons, and the inline connector device connected between the communication device and an audio output device;
switching the functions of the inline connector device from a first mode for controlling audio settings to a second mode for receiving transaction information;
receiving transaction information from a user via the control buttons of the inline connector device in the second mode that was switched from the first mode; and
processing the transaction information.

2. The communication device of claim 1, wherein the inline connector device is registered with a payment service provider and is associated with a payment account of the user at the payment service provider.

3. The communication device of claim 1, wherein the inline connector device comprises a display configured to display audio information in the first mode and display the transaction information in the second mode.

4. The communication device of claim 1, wherein the transaction information includes a command to make a purchase.

5. The communication device of claim 4, wherein the control buttons include plus and minus buttons on the inline connector device to control a price for the purchase.

6. The communication device of claim 4, wherein the operations further comprise:
receiving a request for making the purchase;
determining a potential purchase target; and
providing audio instructions to the user to enter information for making the purchase via the control buttons in the second mode.

7. The communication device of claim 6, wherein a microphone on the inline connector device receives the request for making the purchase.

8. A method comprising:
receiving, via an inline connector device connected to a communication device, a request to switch functions of the inline connector device via control buttons, and the inline connector device connected between the communication device and an audio output device;
switching the functions of the inline connector device from a first mode for controlling audio settings to a second mode for receiving transaction information;
receiving transaction information from a user via the control buttons of the inline connector device in the second mode that was switched from the first mode; and
processing the transaction information.

9. The method of claim 8, wherein the inline connector device is registered with a payment service provider and is associated with a payment account of the user at the payment service provider.

10. The method of claim 8, wherein the inline connector device comprises a display configured to display audio information in the first mode and display the transaction information in the second mode.

11. The method of claim 8, wherein the transaction information includes a command to make a purchase.

12. The method of claim 11, wherein the control buttons include plus and minus buttons on the inline connector device to control a price for the purchase.

13. The method of claim 11, further comprising:
receiving a request for making the purchase;
determining a potential purchase target; and
providing audio instructions to the user to enter information for making the purchase via the control buttons in the second mode.

14. The method of claim 13, wherein a microphone on the inline connector device receives the request for making the purchase.

15. A non-transitory machine-readable medium comprising a plurality of machine-readable instructions which when executed by one or more processors of a communication device are adapted to cause the communication device to perform a method comprising:
receiving, via an inline connector device connected to the communication device, a request to switch functions of the inline connector device via control buttons, and the inline connector device connected between the communication device and an audio output device;
switching the functions of the inline connector device from a first mode for controlling audio settings to a second mode for receiving transaction information;
receiving transaction information from a user via the control buttons of the inline connector device in the second mode that was switched from the first mode; and
processing the transaction information.

16. The non-transitory machine-readable medium of claim 15, wherein the inline connector device is registered with a payment service provider and is associated with a payment account of the user at the payment service provider.

17. The non-transitory machine-readable medium of claim 16, wherein the inline connector device comprises a display configured to display audio information in the first mode and display the transaction information in the second mode.

18. The non-transitory machine-readable medium of claim 16, wherein the transaction information includes a command to make a purchase.

19. The non-transitory machine-readable medium of claim 18, wherein the control buttons include plus and minus buttons on the inline connector device to control a price for the purchase.

20. The non-transitory machine-readable medium of claim 18, further comprising:
receiving a request for making the purchase;
determining a potential purchase target; and providing audio instructions to the user to enter information for making the purchase via the control buttons in the second mode.

\* \* \* \* \*